(12) United States Patent
Boudreault et al.

(10) Patent No.: US 10,657,587 B2
(45) Date of Patent: *May 19, 2020

(54) LISTING AND EXPIRING CASH SETTLED ON-THE-RUN TREASURY FUTURES CONTRACTS

(71) Applicant: Chicago Mercantile Exchange Inc., Chicago, IL (US)

(72) Inventors: James Boudreault, Palatine, IL (US); John Wiley, New York, NY (US); Frederick Sturm, Chicago, IL (US); Jonathan Kronstein, Elmhurst, IL (US); Suzanne Spain, Chicago, IL (US); Peter Barker, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 157 days.

This patent is subject to a terminal disclaimer.

(21) Appl. No.: 13/954,559

(22) Filed: Jul. 30, 2013

(65) Prior Publication Data

US 2013/0317971 A1 Nov. 28, 2013

Related U.S. Application Data

(63) Continuation of application No. 13/183,061, filed on Jul. 14, 2011, now Pat. No. 8,527,393.

(51) Int. Cl.
*G06Q 40/00* (2012.01)
*G06Q 40/06* (2012.01)
(Continued)

(52) U.S. Cl.
CPC .......... *G06Q 40/00* (2013.01); *G06Q 40/04* (2013.01); *G06Q 40/06* (2013.01); *G06Q 40/02* (2013.01); *G06Q 40/08* (2013.01)

(58) Field of Classification Search
CPC ........ G06Q 40/06; G06Q 40/00; G06Q 40/04; G06Q 40/08; G06Q 40/02; G06Q 20/10
(Continued)

(56) References Cited

U.S. PATENT DOCUMENTS 7,711,632 B2 * 5/2010 Chorna et al. ............... 705/37
7,840,483 B2 * 11/2010 Youngren .............. G06Q 40/04
705/37

(Continued)

FOREIGN PATENT DOCUMENTS

CA 2642400 * 10/2008 ............. G06Q 40/00
CA 2642400 5/2009
(Continued)

OTHER PUBLICATIONS

John Youngdahl, Brad Stone, and Hayley Boesky; Journal of Fixed Inocme; "Implications of a Disappearing Treasury Debt Market. ( Statistical Data Included)"; Mar. 2001, V10 14; pp. 1-11. (Year: 2001).*

(Continued)

*Primary Examiner* — Mike Anderson
(74) *Attorney, Agent, or Firm* — Lempia Summerfield Katz LLC

(57) ABSTRACT

The disclosed embodiments relate to determining a listing date, an expiration date and the cash settlement price of a futures contract, i.e. a Treasury Futures, for the delivery of the most recently issued, referred to as an on-the-run, US treasury Note of a particular maturity by reference to the U.S. Treasury Auction cycle and the difference between a resultant industry surveyed swap rate and a resultant industry surveyed swap spread of the respective tenors (time remaining until maturity) of the on-the-run treasury futures.

20 Claims, 8 Drawing Sheets

(51) Int. Cl.
*G06Q 40/04* (2012.01)
*G06Q 40/02* (2012.01)
*G06Q 40/08* (2012.01)

(58) Field of Classification Search
USPC .......................................... 705/35, 36 R, 37
See application file for complete search history.

(56) References Cited

U.S. PATENT DOCUMENTS

| | | | |
|---|---|---|---|
| 7,966,245 B2 | 6/2011 | Harrison | |
| 8,407,123 B2 * | 3/2013 | Jacoby | 705/35 |
| 8,639,606 B1 * | 1/2014 | Shakarchi et al. | 705/37 |
| 2002/0010670 A1 | 1/2002 | Mosler et al. | |
| 2004/0220871 A1 | 11/2004 | Benning | |
| 2006/0143099 A1 | 6/2006 | Partlow et al. | |
| 2006/0253360 A1 * | 11/2006 | Gould | 705/35 |
| 2007/0136180 A1 * | 6/2007 | Salomon | G06Q 40/04 705/37 |
| 2010/0030600 A1 * | 2/2010 | Thomas | G06Q 10/10 705/35 |
| 2010/0094744 A1 * | 4/2010 | Van Slyke et al. | 705/37 |
| 2010/0138362 A1 * | 6/2010 | Whitehurst | G06Q 40/04 705/36 R |
| 2010/0299244 A1 * | 11/2010 | Williams, III | G06Q 40/02 705/38 |
| 2011/0082783 A1 | 4/2011 | Boberski | |

FOREIGN PATENT DOCUMENTS

| | | | | |
|---|---|---|---|---|
| WO | 9618160 | | 6/1996 | |
| WO | WO 96/18160 | * | 6/1996 | ............ G06F 17/60 |

OTHER PUBLICATIONS

Chan, Leo Hung-Lam; "The impacts of cash settlement: Three empirical tests"; 2001; p. 1. (Year: 2001).*
Cita, John; "Cash Settlement Futures Contracts: Issues in the Design of Settlement Provisions"; 1993; p. 1. (Year: 1993).*
Howard Packowitz, "CME to List Cash-Settled Treasury Futures Tied to Auctions", Aug. 30, 2010, 2 pages.
International Search Report and Written Opinion from PCT/US2012/037878 dated Jul. 19, 2012.
John Cita, "Cash Settlement Futures Contracts: Issues in the Design of Settlement Provisions", 1993, 1 page.
John Youngdahl et al., "Implications of a Disappearing Treasury Debt Market", Mar. 2001, pp. 1-11, V10 14, Journal of Fixed Income.
Julian D.A. Wiseman, "A Better Auction Mechanism, and Why Governments Should Sell Futures Rather Than Debt", 1997, 6 pages.
Leo Hung-Lam Chan, "The Impacts of Cash Settlement: Three Empirical Tests", 2001, 1 page.
Wall Street Letter, "CME to Launch On-the-Run Treasury Futures", Oct. 8, 2010, 1 page.
www.cls-group.com, "CLS Statistics on Foreign Exchange Activity", Oct. 11, 2010, pp. 1-26.
International Preliminary Report on Patentability from related PCT Application No. PCT/US2012/037878, dated Jan. 14, 2014, WO.

* cited by examiner

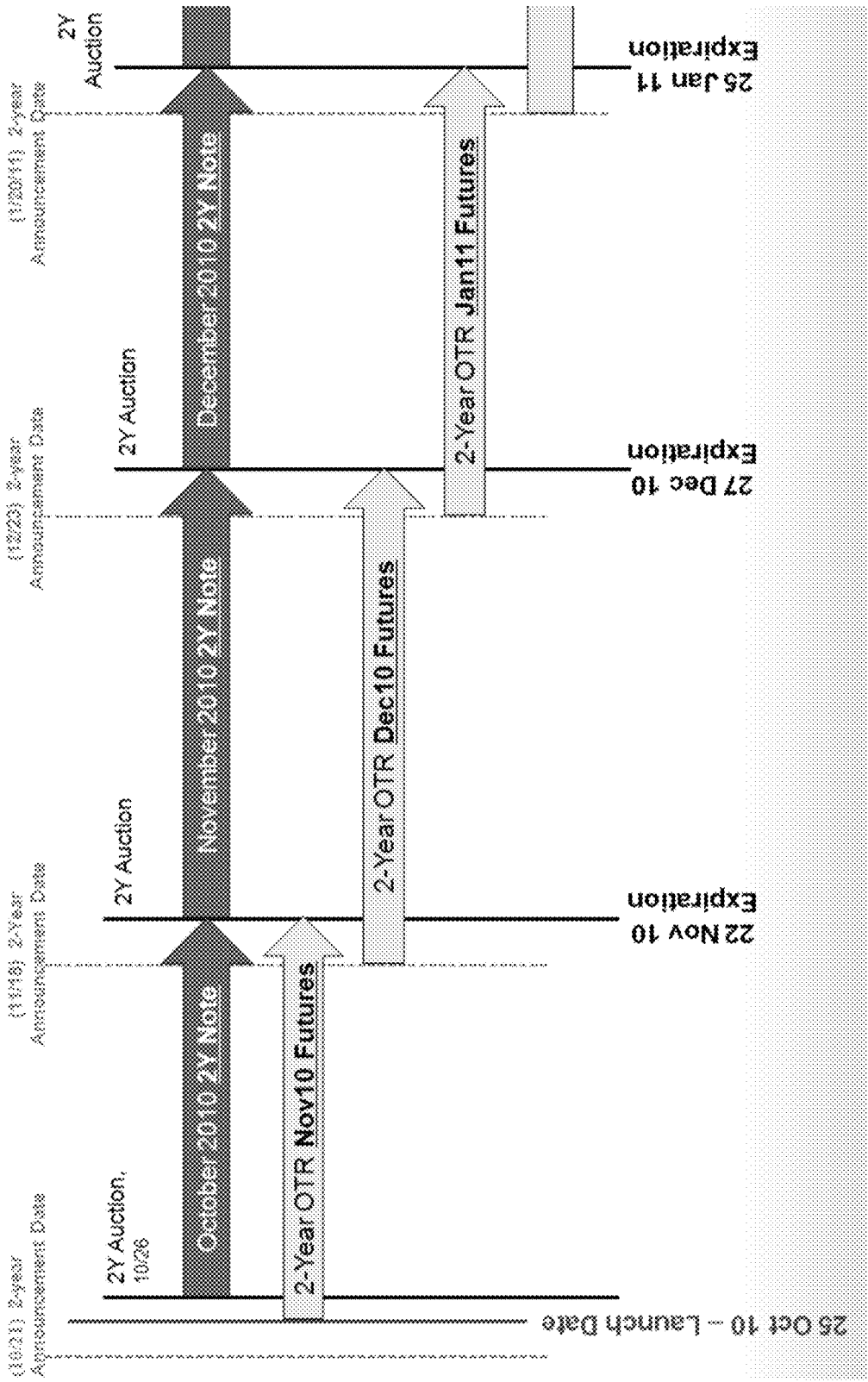

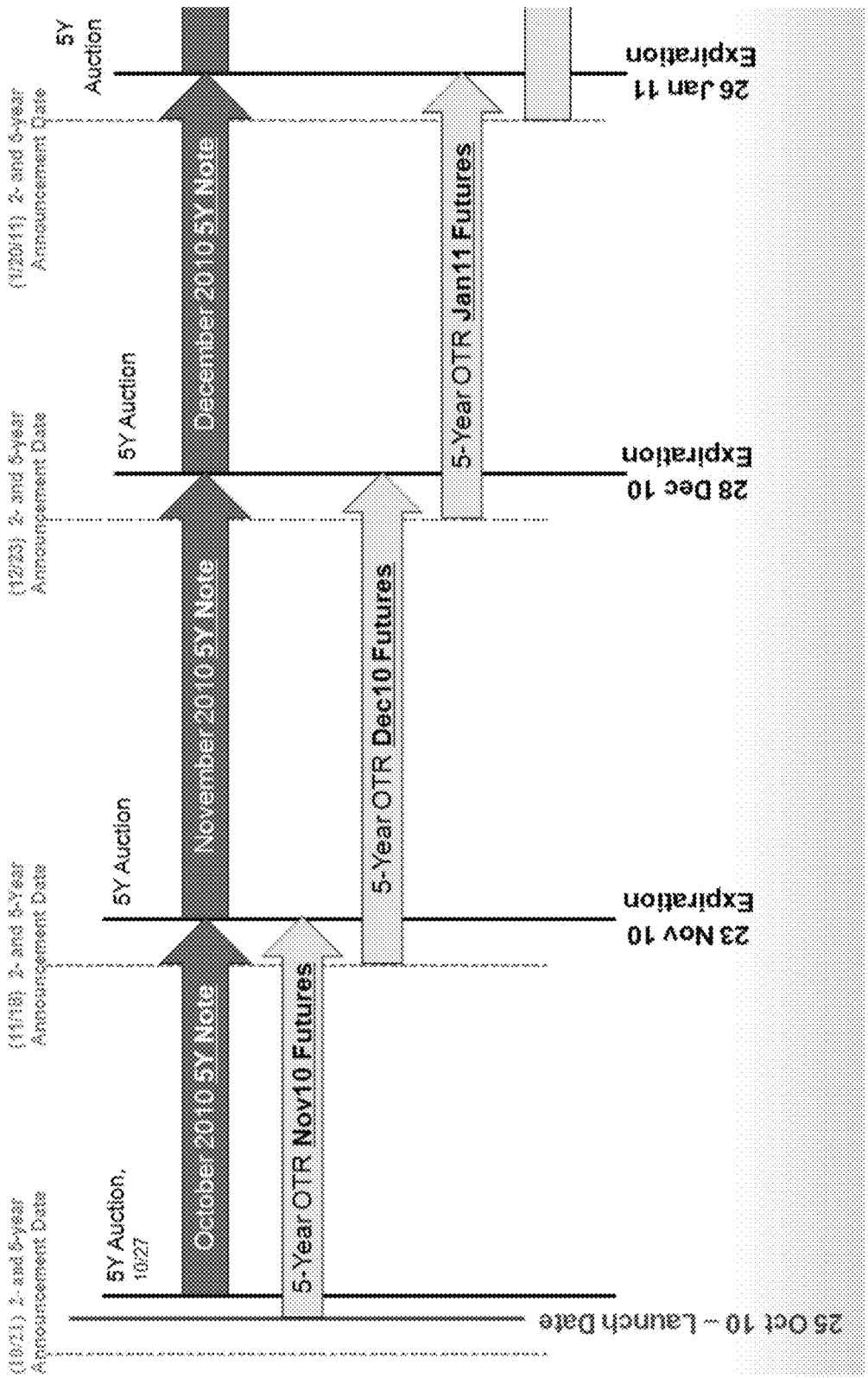

LISTING AND EXPIRING CASH SETTLED ON-THE-RUN TREASURY FUTURES CONTRACTS

RELATED APPLICATIONS

This application is a continuation under 37 CFR § 1.53(b) of U.S. patent application Ser. No. 13/183,061, filed Jul. 14, 2011 now U.S. Pat. No. 8,527,393, the entire contents of which are hereby incorporated by reference.

BACKGROUND

Futures Exchanges, referred to herein also as an "Exchange", such as the Chicago Mercantile Exchange Inc. (CME), provide a marketplace where futures and options on futures are traded. Futures is a term used to designate all contracts covering the purchase and sale of financial instruments or physical commodities for future delivery or cash settlement on a commodity futures exchange. A futures contract is a legally binding agreement to buy or sell a commodity at a specified price at a predetermined future time. An option is the right, but not the obligation, to sell or buy the underlying instrument (in this case, a futures contract) at a specified price within a specified time. Each futures contract is standardized and specifies commodity, quality, quantity, delivery date and settlement. Cash Settlement is a method of settling a futures contracts by cash rather than by physical delivery of the underlying asset whereby the parties settle by paying/receiving the loss/gain related to the contract in cash when the contract expires based on a reference rate such as interest rate, exchange rate or index rate or value which is substantially out of the control of the parties.

Typically, the Exchange provides a "clearing house" which is a division of the Exchange through which all trades made must be confirmed, matched and settled each day until offset or delivered. The clearing house is an adjunct to the Exchange responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House. In the case of the CME's clearing house, all clearing members not specifically designated as Class B members are considered Class A clearing members. In the CME there are three categories of clearing members: 1) CME clearing members, qualified to clear transactions for all commodities; 2) International Monetary Market (IMM) clearing members, qualified to clear trades for only IMM and Index and Option Market (IOM) commodities; and 3) IMM Class B clearing members, solely limited to conducting proprietary arbitrage in foreign currencies between a single Exchange-approved bank and the IMM and who must be guaranteed by one or more Class A non-bank CME or IMM clearing member(s). Note that a "member" is a broker/trader registered with the Exchange.

With respect to cash settled contracts, at settlement or otherwise upon expiration of the contract, the Exchange further facilitates the requisite exchange of value by computing value of the positions held by the parties with respect to the market value of underlying asset.

Accordingly, to create a new product, such as a new type of futures contract for a particular underlying asset, the Exchange needs to determine how to value the underlying asset for the purpose of settlement, when to list the new contract, or otherwise offer it for trading and how long it should trade for before expiring and settling. For contracts requiring physical delivery of the underlying asset, creation, trading and settlement of such contracts is not difficult assuming there is an adequate supply of the underlying asset to facilitate physical delivery thereof when required. Alternatively, if the underlying asset is relatively easy to value but difficult to physically deliver, such as where the underlying asset is an index or portion thereof, the delivery may be specified as cash settlement.

BRIEF DESCRIPTION OF THE DRAWINGS

FIGS. 6A-6C show exemplary listing cycles for 2, 5 and 10 year OTR Treasury Futures contracts.

DETAILED DESCRIPTION OF THE DRAWINGS AND PRESENTLY PREFERRED EMBODIMENTS

Figure 1:
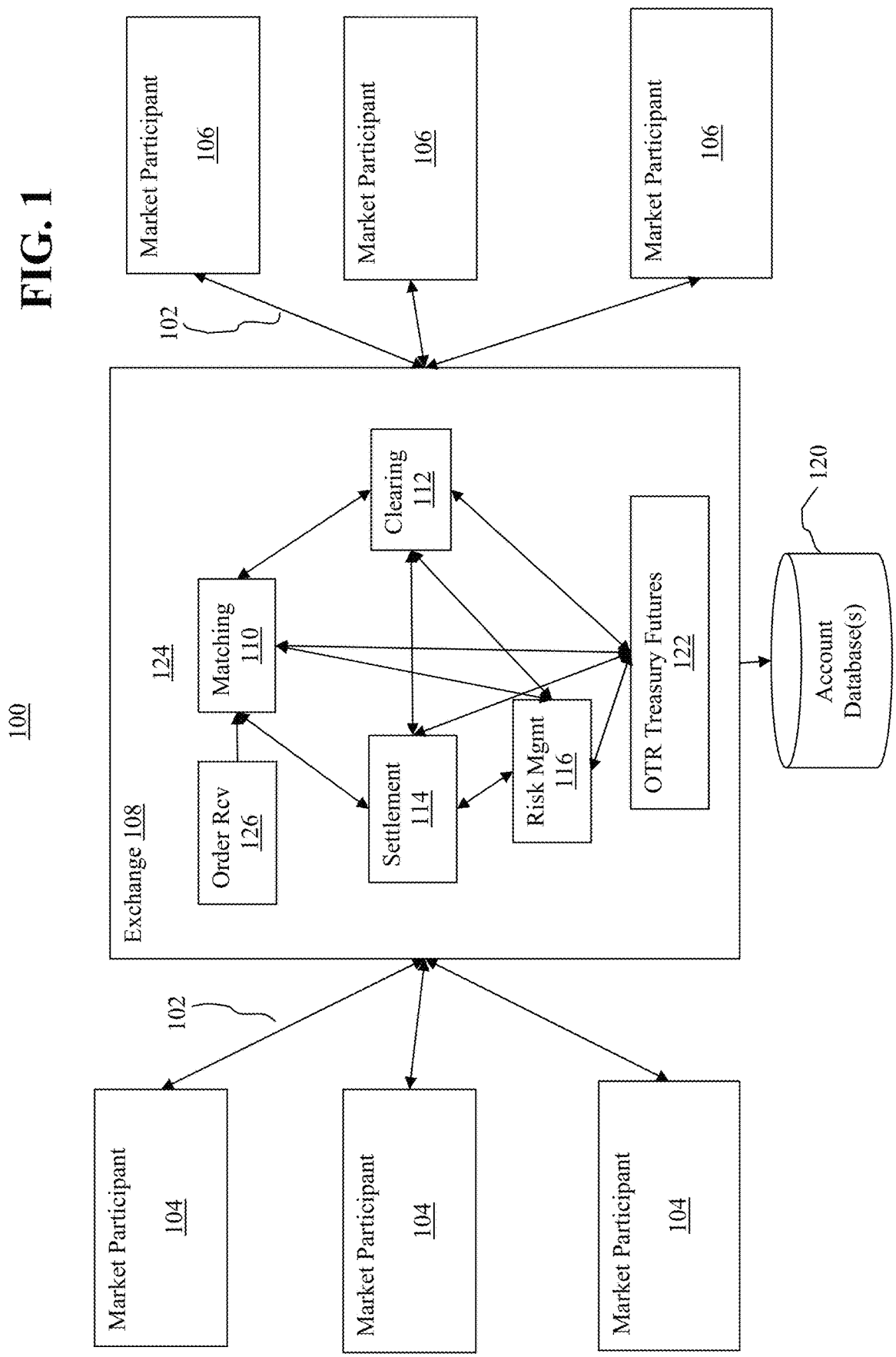
FIG. 1 shows a block diagram of an exemplary network for trading On-The-Run ("OTR") Treasury futures contracts according to one embodiment.

A system is disclosed for determining a listing date, an expiration date and the cash settlement price of a futures contract, i.e. a Treasury Futures, for the delivery of the most recently issued, referred to as an on-the-run US treasury Note of a particular maturity by reference to the U.S. Treasury Auction cycle and the difference between a resultant industry surveyed swap rate and a resultant industry surveyed swap spread of the respective tenors (time remaining until maturity) of the OTR treasury futures.

As discussed above, to create a new product, such as a new type of futures contract for a particular underlying asset, the Exchange needs to determine how to value the underlying asset, when to list the new contract, or otherwise offer it for trading and how long it should trade for before expiring. For contracts requiring physical delivery of the underlying asset, creation, trading, and settlement of such contracts is not difficult assuming there is an adequate supply of the underlying asset to facilitate physical delivery thereof when required. Alternatively, if the underlying asset is relatively easy to value but difficult to physically deliver, such as where the underlying asset is an index or portion thereof, the delivery may be specified as cash settlement.

However, when the underlying asset is difficult to value and difficult to deliver, creation of a futures contract based thereon is more complicated. For example, it may be desirable to trade futures contracts where the underlying asset is a U.S. Treasury, such as an the "on-the-run" issue of a U.S. Treasury Note for a particular tenor, necessitating a method of either delivering or valuing such notes. While there exists a certain demand for derivative exposure to the respective and singular, "on-the-run" (most recently auctioned Treasury securities) point at each benchmark tenor of the Treasury yield curve (2-year, 5-year, 10-year, and 30-year maturities), any such futures contracts that call for physical delivery of a single security at expiration, the on-the-run security for instance, would present challenges, as well as garner regulatory scrutiny, relating to potential restriction of physical supply. Physical supply of Treasury securities is a result of fiscal and monetary policy of the United States, something which is completely out of the control, and irrespective of the Exchange's desire to provide robust, risk-management solutions to the marketplace. These factors make expiration by physical delivery of a single-issue futures deliverable undesirable.

Existing Treasury futures contracts, therefore, may utilize a basket of physical delivery securities, conversion factors, and a "cheapest to deliver" valuation model to approximate cash-market Treasury exposure. This method, however robust, generally either represents price dynamics of a Treasury sector or that of one or several Treasury securities, without certainty to the respective benchmark security at a specific tenor on the Treasury yield curve.

Secondary fixed income markets, including those for U.S. Treasury securities, are fragmented across multiple execution venues, including phone brokerage and multiple electronic trading platforms. Secondary fixed income markets such as these do not enjoy any such "consolidated tape," i.e. a unifying mechanism among markets providing price transparency therebetween, that exists in the U.S. equity markets. As such, although secondary markets for U.S. Treasury securities are considered very liquid, price differentials exist among secondary markets at any given time. Accordingly, there exists no current methodology for ascertaining a consensus on-the-run U.S. Treasury yields or prices for the 2-year, 5-year, 7-year, 10-year, and 30-year points on the U.S. Treasury yield curve.

One method of valuing the underlying asset may be based on over the counter ("OTC") Total return swaps on a basket of representative Treasury securities to produce a rate of return that is equal to the basket, minus any commissions and other administration fees. However, the prices utilized are generally that of the liquidity provider only, not necessarily representative of market consensus yields or prices, which, as mentioned above, may be significantly divergent of the market consensus.

The disclosed embodiments relate to valuing the OTR treasury based on an industry consensus which avoids skewing the value based on any one market participant or sector thereby creating a contract value for which the market may have confidence in.

The disclosed embodiments may have potential application in the interest rate derivatives area (futures, options on futures, and OTC cleared or un-cleared swaps) where it may be utilized as an accurate and effective exposure or hedging vehicle for most recently auctioned, U.S. Treasury securities, referred to as "on-the-run". A suite of products may be offered on the CME Globex electronic trading platform and the CBOT Trading Floor and cleared by CME Clearing House, such as the CBOT 2-Year, 5-Year, and 10-Year On-The-Run U.S. Treasury futures.

The disclosed embodiments may also have potential applications in other areas of interest rate derivatives, such as options on futures or OTC swaps (over-the-counter cleared or un-cleared swaps) where they may be utilized as an accurate and effective exposure or hedging vehicle for most recently auctioned ("on-the-run") U.S. Treasury securities. However, it has the added advantage of potentially being offered in the form of a futures contract transacted on a widely-distributed electronic trading platform and subject to the financial sureties commonly associated with futures contracts.

Generally, the disclosed embodiments generate a "final settlement futures price" utilized for final cash-settlement at expiration. The final settlement price utilizes a process that calculates a market consensus yield for each product's tenor, e.g. a U.S. Treasury Note of 2 year, 5 year or 10 year tenor, and transforms that consensus yield into a "final settlement futures price" that serves as that contract expiration month's final mark-to-market at expiration, i.e. the price or value reflecting its current market value at the time of settlement.

In one embodiment, a combination of two robust industry surveys is utilized to ascertain a consensus on-the-run Treasury yield for 2-year, 5-year, and 10-year Treasury securities. In one embodiment, consensus results are determined by subtracting the International Swaps and Derivatives Association (ISDA®) surveyed resulting swap spread from the ISDA® surveyed resulting swap rate of the respective tenors in order to arrive at the consensus benchmark on-the-run Treasury yield on a contract's given expiration date. Ascertainment of consensus on-the-run yields by utilizing ISDA survey results in this way incorporates multiple inputs from multiple secondary market sources.

Once the respective consensus on-the-run yield is determined, the yield is utilized in a bond pricing formula, shown below, rounded to the nearest $\frac{1}{4}$ of $\frac{1}{32}$nd price point utilizing a rounding formula, described below in MS Excel® terminology, resulting in a present value of the underlying U.S. Treasury Note which is then utilized as the final settlement price of the futures contracts for the delivery thereof. Moreover, the final settlement price is utilized to expire the contracts by cash-settlement utilizing a final mark-to-market.

As opposed to basing the computation of the yield on the yield to maturity ("YTM") of the underlying U.S. Treasury, i.e. the rate of return if held until maturity based on the current market price, par value, coupon rate and remaining time to maturity, the disclosed embodiments utilize the (SY–SP) which is distinctly different. YTM is one measure of a fixed income security's value while (SY–SP) are rates from the Interest Rate Swap market that are published daily by Intercapital Broker ("ICAP") on behalf of ISDA. YTM is an observed market statistic that can be observed/calculated in real time anytime the particular fixed income security is open for trading on any number of different trading platforms, while (SY–SP) are ISDA survey results which are surveyed and tallied from the ISDA panel members once per day at 11:00 a.m. NY time (some rates are collected twice per day (4 pm NY), but not all of them). (SY–SP) has one source, the ISDA/ICAP surveyed results of the panel members, whereas 10 different market participants could potentially have 10 different opinions of a security's YTM at any given time due to the fragmentation of the U.S. fixed income markets. Using the ISDA (SY–SP) removes ambiguity from the final figure, as there exists no argument as to what the ISDA swap rate and swap spread is for a particular tenor for any given business day. Furthermore, (SY–SP) is somewhat constrained in the fact that it allows you to determine a price only once per day based on 11:00 am NY time, which accommodates the determination of the final settlement price of a cash-settled futures contract.

Accordingly, the disclosed embodiments provide a robust process that will always result in a consensus, on-the-run benchmark yield that is fully representative of the secondary markets at expiration. Further, the resulting on-the-run yield may then be used to calculate and determine a final settlement price in order to cash-settle the contracts at expiration. Cash-settlement at expiration ensures cash-futures price convergence. Also, expiry by cash-settlement is not impacted by the constraints of deliverable supply that is present in any existing physical delivery contract.

In one embodiment, final settlement value at expiration, in price points, may be computed as $$100*[C/(SY-SP)_m+(1-C/(SY-SP)_m)*(1+(SY-SP)_m/200)^{-2m}]$$

Where:
- 100 is used to align the decimal point of the result and is implementation dependent;
- C=notional semiannual coupon;
- $(SY-SP)_m$=m ISDA Benchmark Swap Rate for the pertinent term to maturity minus the corresponding m ISDA Swap Spread on the last day of trading. These figures are published at approximately 10:30 am Chicago time, and are expressed in percent terms. Final cash settlement occurs on the expiring contract's Last Trading Day;
- m=term to maturity (2, 5, or 10 years) of ISDA Benchmark Swap Rate and ISDA Swap Spread;
- 200 accounts for the semi-annual nature of the notional coupon with a multiplier of 100; and
- the exponent results in the number of notional or theoretical interest payments for a Note with a semi-annual coupon payment.

Example: If m ISDA Benchmark is 3.966% and m ISDA Swap Spread is 0.315%, then $(SY-SP)_m$ equals 3.651%. The final settlement price is the final settlement value rounded to nearest one quarter of one thirty-second of one point.

Alternate sources of the consensus survey results may be used to determine the benchmark swap rates and swap spreads. In the examples above, ISDA/ICAP is used as the surveying agency. Other entities may be substituted to obtain such information, such as IDC, Bloomberg, and internal polling of dealers, data vendors, or traders.

Final settlement price is the final settlement value rounded to nearest one quarter of one thirty-second of one point, as illustrated in Microsoft Excel® terminology below:
- A=SYm
- B=SPm
- C=(SY−SP)m
- D=100000*((4/(100*(SY−SP)m))+((1−(4/(100*(SY−SP)m)))*((1+((100*(SY−SP)m)/200))^−20)))
- E=CEILING(D,1000/128)
- F=ABS(E-D)
- G=E/1000
- H=FLOOR(D,1000/128)
- I=ABS(H-D)
- J=H/1000
- K=IF(F>I,H,IF(F=I,E,E))
- L=K/1000
- FINAL CASH-SETTLEMEN PRICE=TRUNC(L)&" "&((L-TRUNC(L))*32)&"/32"
- m=term to maturity (2, 5, or 10 years) of m ISDA® Benchmark Swap Rate and m ISDA® Swap Spread.

Accordingly, OTR Treasury futures may trade in price terms and expire by cash settlement, with reference to on-the-run Treasury yields as reflected in ISDAFIX Benchmark Swap Rates and Swap Spreads on the last day of trading. The final settlement price formula converts the underlying on-the-run Treasury yield into a price index, whose dynamics resemble those of a hypothetical $100,000 face-value Treasury note paying a semi-annual coupon rate of 4 percent per annum. In one implementation, OTR Treasury futures may trade both in open outcry and on CME Globex, as well as executed via ex-pit transactions.

The disclosed embodiments further relate to determining, or otherwise computing, the listing date and expiry/expiration date of an on-the-run (OTR) treasury futures contract by reference to the auction cycle dates for the underlying on-the-run Treasury notes. The listing date is the first date that the contract can be traded whereas the expiration date is final day of settlement, which may or may not coincide with the last trading day.

In particular, existing Treasury futures utilize listing and expiration schedules that are "standard" with respect to a specific number of days within a calendar month. For example, CME Group Treasury futures' last trading dates are defined as the last business day of the contract month (2-Year, 3-Year, and 5-Year Treasury futures) or the 8th to last business day of the contract month (10-Year, Bond, and Long-Term Treasury Note and Bond futures).

Expiring contracts in this manner may not adequately take into consideration the underlying Treasury securities market's timing of Treasury auctions, which determines the identity of each benchmark, on-the-run (most recently auctioned) Treasury security at each U.S. Treasury issue's tenor.

Furthermore, existing derivative solutions do not incorporate the period for which a Treasury security has been announced, but not yet auctioned, otherwise known as the "when-issued" or "WI" trading period. When Issued trading allows market participants to trade a Treasury security that has yet to be auctioned. Trade settlement for all When Issued trading typically occurs after the Treasury auction occurs, on the auction settlement date. When Issued U.S. Treasury securities are an actively traded cash market, yet there exists no derivatives for these securities during these periods. The lack of this feature reduces the risk management utility of existing solutions for market participants that plan to participate in upcoming U.S. Treasury securities auctions.

The disclosed embodiments determine a contract's particular listing date and a contract's particular final expiration date by aligning the futures contract month listing schedule and expiration schedule with that of the U.S. Treasury's Tentative Auction Schedule.

In one embodiment, the 2-Year and 5-Year OTR Treasury futures contract month listings are enabled for trading on the exact Trade Date that corresponds to the Treasury's Auction Announcement Date, also known as the beginning of when-issued trading. In one embodiment, the 10-Year OTR Treasury futures are enabled for trading on the exact Trade Date that corresponds to the business day following the U.S. Treasury's Auction Announcement Date, also typically known as the day after the beginning of when-issued trading. As the U.S. Treasury's Tentative Auction Schedule is published on the Treasury's Auction Announcement Date and only looks forward 3 months, it will not list the date of the next quarterly 10 year Note auction. Therefore as the 10 year Note Auction Announcement date can presently only be known on that date, and this data must be suitably programmed into the Exchange's record keeping systems, the listing date is set as the next business day. It will be appreciated that this is implementation dependent and that, in other embodiments where the next quarterly 10 year Note auction is announced in advance and/or the Exchange's record keeping systems can be updated on the same day as the announcement, the listing date of the 10 year OTR Treasury Futures may be enabled on the exact Trade Date that corresponds to the Treasury's Auction Announcement Date as with the 2 year and 5 year OTR Treasury Futures.

All OTR Treasury futures contracts expire on the morning of the date of the new U.S. Treasury note auction for its tenor within the named month of expiration. The expiration date is selected based on the date of the next new auction listed in the U.S. Treasury's Tentative Auction Schedule on the futures contract's listing date.

This preciseness of the listing and expiration schedules may ensure that market participants will have the ability to trade the derivative product during the underlying Treasury security's "when-issued" period. Furthermore, it enables direct and accurate exposure to each new benchmark Treasury security, as the contract listings correspond with the auction timing and frequencies. To explain further, the 2-Year and 5-Year OTR Treasury futures have monthly expiration schedules because the underlying new securities are auctioned on a monthly basis, while the 10-Year OTR Treasury futures have quarterly expirations because the underlying new securities are auctioned on a quarterly basis. The disclosed embodiments remove any inefficient overlap period. On the morning of the next new auction, the current OTR Treasury futures contract month may expire literally two hours before the new auction that afternoon.

2-Year, 5-Year, and 10-Year OTR Treasury futures listing cycles will correspond to the auction cycles for 2-year, 5-year, and 10-year U.S. Treasury notes, respectively. The lifecycle of each futures contract will match the underlying Treasury note's lifecycle as the "on-the-run" issue.

Each OTR Treasury futures contract will be listed around the beginning of WI trading. That is, each 2-Year or 5-Year OTR Treasury futures contract will be listed for trading on the Auction Announcement Date for the corresponding underlying reference (2-year or 5-year) Treasury note, whereas each 10-Year OTR Treasury futures contract will be listed for trading on the business day following the Auction Announcement Date for the contract's underlying reference 10-year Treasury note. The futures contract will continue to trade throughout this Treasury note's tenure as the "on-the-run" issue. Trading in the contract will terminate on the morning of the auction of a new Treasury note, approximately two hours before the contract's underlying reference Treasury note ceases to be the "on-the-run" issue and becomes the "old" Issue, also known generically as "off-the-run".

Initially, one futures expiry will be listed for each of the three contract grade terms to maturity (2-year, 5-year, and 10-year). Subsequently, and in alignment with the Treasury Department's Auction Announcement schedule, a new futures expiry will be listed approximately three to five business days prior to expiration of the nearby futures. The expiration/last trading day for a specific futures contract is the date of the auction of a new Treasury note (corresponding to the contract's term to maturity) in that futures contract's named delivery month. Typically, this date will be as indicated in the latest "Tentative Auction Schedule of U.S. Treasury Securities" as published by the U.S. Treasury Department. Once this date is set as the contract's last trading day, it is fixed. It will remain the last trading/expiration day for that futures contract, regardless of any changes that the U.S. Treasury Department might subsequently make to its auction schedule.

2-Year and 5-Year OTR Treasury futures will have monthly expiries. The first trade date for each 2-Year or 5-Year OTR Treasury futures contract is the auction announcement date for, and the beginning of WI trading in, that futures contract's underlying reference 2-year or 5-year Treasury note. The futures contract's last trading day, and its final settlement, takes place on the day of the next scheduled auction of a 2-year or a 5-year Treasury note, respectively, in the following month.

10-Year OTR Treasury futures will have quarterly expiries in February, May, August, and November. While the U.S. Treasury conducts auctions of 10-year Treasury notes every month, it auctions new 10-year issues only four times a year, in February, May, August, and November. An auction in any other month is a "re-opening" that adds to the amount outstanding of whatever 10-year note happens to be on-the-run at the time. Since these re-opening auctions do not change the status of the on-the-run Treasury issue, 10-Year OTR Treasury futures likewise adhere to a quarterly listing and expiration cycle.

Given the limited publication schedule for the Tentative Auction Schedule for U.S. Treasury Securities, the first trade date for any 10-Year OTR Treasury futures contract is the business day following the Auction Announcement Date for the contract's underlying reference 10-year Treasury note, i.e., the day after the beginning of WI trading in that note. The last trading day for the futures contract, and its final settlement, is on the date given by the Tentative Auction Schedule for the auction of a new 10-year Treasury note three months later.

TABLE 1

ON-THE-RUN U.S. TREASURY FUTURES CONTRACT SPECIFICATIONS
(All times are Chicago time (CT), unless otherwise noted)

| | |
|---|---|
| Underlying Instrument | The notional price of a 2-Year, 5-Year, or 10-Year U.S. Treasury note with $100,000 notional face value, paying a semiannual coupon at the rate of 4 percent per annum. The price is based on the corresponding on-the-run Treasury note yield of the specified term to maturity.. The on-the-run Treasury note yield is derived as the ISDA ® Benchmark Swap Rate minus the ISDA Swap Spread, both at the contract grade term to maturity. |
| Price Basis | Par is on the basis of 100 points.<br>2-Year and 5-Year OTR Treasury Futures: Points ($1,000) and quarters of 1/32 of a point. For example, 102-202 represents 102 and 20.25/32nds, 102-205 represents 102 and 20.5/32nds, 102-207 represents 102 and 20.75/32nds, and 102-21 represents 102 and 21/32nds.<br>10-Year OTR Treasury Futures: Points ($1,000) and halves of 1/32 of a point. For example, 126-16 represents 126 and 16/32nds, and 126-165 represents 126 and 16.5/32nds. |

TABLE 1-continued

ON-THE-RUN U.S. TREASURY FUTURES CONTRACT SPECIFICATIONS
(All times are Chicago time (CT), unless otherwise noted)

| | |
|---|---|
| Minimum Price Increment | 2-Year and 5-Year OTR Treasury Futures: One-quarter of 1/32 of one point, or $7.8125 per contract.<br>10-Year OTR Treasury Futures: One-half of 1/32 of one point, or $15.625 per contract, except for intermonth spreads, where the minimum price fluctuation shall be one-quarter of 1/32 of one point, or $7.8125 per contract. |
| Contract Months | Expiry listings correspond to U.S. Treasury auctions for 2-year, 5-year, and 10-year Treasury notes. Final Settlement Date is the morning of the following new Treasury note auction (in the named expiry month). Initially, one expiry will be listed. Deferred expiries will be listed approximately 3-5 business days prior to expiration of the nearby expiry.<br>2-Year and 5-Year OTR Treasury futures: 2- and 5-Year OTR Treasury futures will have monthly expiries. The deferred expiry will be listed on the auction announcement date of the underlying reference Treasury note (the beginning of when Issued (WI) trading).<br>10-Year OTR Treasury futures: 10-Year OTR Treasury futures will have February, May, August, November expiries. The deferred expiry will be listed on the business day following the underlying reference Treasury note auction Announcement date (the day after the beginning of WI trading).<br>Due to the limitations of the U.S. Treasury's Tentative Auction Schedule, the first trade date for any 10-Year OTR Treasury futures expiry is the business day following the Announcement Date of the underlying reference 10-year Treasury note, i.e., the day after the beginning of WI trading. The last trading day/final settlement takes place on the date of the next scheduled new 10-Year note auction in the following quarter. |
| Last Trading Day | Defined at time of listing as the date of the corresponding new Treasury note auction in the named expiry month, as indicated on the most recently published Tentative Auction Schedule of U.S. Treasury Securities.<br>Trading in an expiring contract ceases at 10:01 a.m. on the last trading day. |
| Final Settlement Price | Cash settlement. The final settlement value, measured in price points, is determined as:<br>2-Year: $100 * [4/(SY\text{-}SP)_2 + (1 - 4/(SY\text{-}SP)_2) * (1 + (SY\text{-}SP)_2/200)^{-4}]$<br>5-Year: $100 * [4/(SY\text{-}SP)_5 + (1 - 4/(SY\text{-}SP)_5) * (1 + (SY\text{-}SP)_5/200)^{-10}]$<br>10-Year: $100 * [4/(SY\text{-}SP)_{10} + (1 - 4/(SY\text{-}SP)_{10}) * (1 + (SY\text{-}SP)_{10}/200)^{-20}]$<br>$(SY\text{-}SP)_2$, $(SY\text{-}SP)_5$, and $(SY\text{-}SP)_{10}$ represent, respectively, ISDAFIX Benchmark Rates for the 2-Year, 5-Year, and 10-Year term to maturity minus the ISDAFIX Swap Spread for the same term to maturity, as published at approximately 10:30 a.m. on the last trading day. (For example, if the ISDAFIX Benchmark Rate is 3.966 percent and the ISDAFIX Swap Spread is 0.315 percent, then (SY-SP) equals 3.651 percent.) Final settlement price is final settlement value rounded to nearest one-quarter of 1/32 of one point. |
| Trading Hours | CME Globex: 5:30 p.m.-4:00 p.m., Sunday-Friday<br>Open Outcry: 7:20 a.m.-2:00 p.m., Monday-Friday |
| Ticker Symbols | CME Globex: 2-Year: T2 5-Year: T5 10-Year: TN<br>Open Outcry/Clearing: 2-Year: TWO 5-Year: FIV 10-Year: TEN |

As shown in Table 1, in one embodiment, trading in an expiring contract ceases at 10:01 a.m. Chicago time on its last trading day. The Exchange may then determine the contract final settlement price, as described above, on the basis of the pertinent on-the-run U.S. Treasury note yield, defined by the ISDA® Benchmark Swap Rate minus the ISDA Swap Spread, as determined in that morning's ISDA-FIX survey. Note that, for any given term to maturity, the Swap Spread may simply be the difference between the on-the-run Treasury yield and the par swap rate. The ISDA-FIX survey is conducted at approximately 10:00 a.m., and the resultant ISDA Benchmark Swap Rates and Swap Spreads are generally published at 10:30 a.m. ISDAFIX is described in more detail below Final Settlement Values for OTR Treasury Futures=

2-Year: $100*[4/(SY\text{-}SP)_2 + (1-4/(SY\text{-}SP)_2)*(1+(SY\text{-}SP)_2/200)^{-4}]$ 5-Year: $100*[4/(SY\text{-}SP)_5 + (1-4/(SY\text{-}SP)_5)*(1+(SY\text{-}SP)_5/200)^{-10}]$ 10-Year: $100*[4/(SY\text{-}SP)_{10} + (1-4/(SY\text{-}SP)_{10})*(1+(SY\text{-}SP)_{10}/200)^{-20}]$ Example: 10-Year OTR Treasury Futures:

Assume that on expiration day for a 10-Year OTR Treasury futures contract, the Morning ISDAFIX 10-Year Swap Rate is 2.601 percent and the ISDAFIX 10-Year Swap Spread is 0.043 percent (i.e., 4.3 bps). The Exchange computes the on-the-run 10-year Treasury yield $(SY\text{-}SP)_{10}$ as 2.558 (equal to 2.601 minus 0.043). Accordingly, the contract's final settlement value would be:

$$\$100 * (4/(SY-SP)_{10} + (1 - 4/(SY - SP)_{10}) * (1 + (SY - SP)_{10}/200)^{-20}) =$$

$$\$100 * (4/2.558 + (1 - 4/2.558) * (1 + 2.558/200)^{-20}) =$$

$$\$112.652 = 112 - 20.88/32nds$$

The final settlement price is 112 21/32nds, i.e., the final settlement value rounded to the nearest ¼ of 1/32nd.

For the US dollar swap market, the ISDAFIX survey occurs each business day at 11:00 a.m. New York time. It covers 13 terms to maturity: 1 year through 10 years, inclusive, plus 15, 20, and 30 years. For Treasury-swap spreads, the survey's scope is 6 terms to maturity: 2 years through 5 years, inclusive, plus 7 and 10 years.

An ICAP or Reuters representative canvasses a panel of contributing dealers for their par swap rate quotes and swap spread quotes. The dealers in the canvass are selected and impaneled by ISDA, ICAP, and Reuters on the basis of each contributor's reputation among dealers, perceived expertise, credit standing, and scale of activity in the US dollar swap market. The US dollar contributor panel currently comprises 15 institutions:

| | | | |
|---|---|---|---|
| Bank of America | Barclays Bank | BNP Paribas | Citigroup |
| Credit Suisse | Goldman Sachs | HSBC | Deutsche Bank |
| JP Morgan Chase | Mizuho | Morgan Stanley | Nomura |
| RBS | UBS | Wells Fargo | |

For any given term to maturity, each contributing dealer provides to the ICAP or Reuters surveyor the midpoint of its own bid/offer spread, i.e., the average of the rate levels (or spread levels) at which that dealer would itself offer and bid a swap (or swap spread), for a notional amount of $50 million. Importantly, the dealer's submission should be a function of its own bid/offer spread, not where it sees mid-market rates or swap spreads being quoted away from itself. Polling takes place by electronic interface (or, in some instances, by email or telephone). During the polling interval, a contributing dealer may update or amend the mid-market quotes it has submitted.

At the conclusion of the polling interval, ISDAFIX Benchmarks are determined as trimmed means. For US dollar swap rates and swap spreads, the Benchmark value at each term to maturity is calculated by:
(1) eliminating the four highest and the four lowest of the mid-market submitted quotes, and then
(2) taking the simple average of the mid-market quotes that remain after the sample has been trimmed.

If every contributing dealer has reported, then the resultant Benchmark Swap Rate or Swap Spread will be an average of seven midmarket quotes. A US dollar Benchmark will be computed and posted, however, as long as at least 10 contributing dealers have participated. Although contributing dealers may submit their mid-market quotes up to five decimal places of precision, the ISDAFIX Benchmarks are computed to just three decimal places. The ISDAFIX Benchmark values, and the mid-market quotes submitted by each contributing dealer, are published on Reuters and Bloomberg screens at around 11:30 a.m. New York time. To learn more, visit www.isda.org.

The disclosed embodiments facilitate:
Direct futures price exposure to on-the-run Treasury note yields (2-, 5-, and 10-year)
Cross-margining with other CME Group interest rate contracts
Enables synthetic replication of TED spreads and Swap spreads vs. Eurodollar and Swap futures
Other potential applications include yield curve spreads vs. cash Treasuries, yield curve spreads among OTR futures, and inter-market spreads vs. conventional physical delivery Treasury futures The disclosed embodiments may be applied to:
TED Spreads—Synthetic 2-year and 5-year TED spreads, via inter-market spreads against the CME Group's Eurodollar futures (2-Year Bundle and 5-Year Bundle).
Treasury-Swap Spreads—Synthetic Swap spreads, via inter-market spreads against the CME Group's Swap futures. Spreads between OTR futures and Eurodollar futures or Swap futures should be more manageable and capital-efficient compared to alternatives.
Treasury Yield Curve Spreads—Synthetic and precise versions of Treasury yield curve strategies (2-year/10-year, 2-year/5-year, and 5-year/10-year curve spreads, and the 2-year/5-year/10-year butterfly), with the benefits of cross-margining, and without the encumbrance of separate financing of one or more legs of the trade.
The popularity of ETFs based on Treasury securities suggests that the OTR futures may appeal to retail participants who are interested in using futures to take views on Treasury yields, but who are ill-equipped to deal with physical delivery or valuing the optionality of existing Treasury futures.
Additional Points on the Yield Curve/Clarity of Maturity Exposure—When market yields are low—specifically, below 6 percent—OTR futures will give market participants access to points on the Treasury yield curve that are effectively unavailable through the existing Treasury futures.
Synthetic CTD—OTR Treasury Basis Trades
Relative value trades between the points on the yield curve that existing Treasury futures CTD's represent vs. the on-the-run points of the yield curve.
Short Selling/Substitutes—OTR futures would be a boon for fiduciary money managers who supervise plans that forbid short selling of Treasury securities but that permit short positions in listed futures contracts. OTR futures would also benefit any market practitioner who does not have direct access to the Treasury repo market, especially CTAs and "futures only" proprietary traders.
Treasury futures that expire by cash settlement would appeal potentially to those for whom physical delivery poses challenges. For example, some fiduciary money managers supervise plans that forbid the use of physical delivery derivative contracts but permit cash-settled contracts.
"When-Issued" Trading—OTR futures should furnish an exchange-listed alternative to over-the-counter Treasury rate-locks.
Listing Example: December 2010 2-Year OTR Treasury Futures:
The underlying reference for the December 2010 futures contract is the 2-year Treasury note that is auctioned in November 2010. December 2010 futures are listed for trading on the Auction Announcement Date for this Treasury note.
Moreover, the December 2010 futures will be listed so as to cease trading on the day in December 2010 which the Tentative Auction Schedule of U.S. Treasury Securities indicates as the date of auction for the next following new 2-year Treasury note. Termination of trading on the last trading day will occur at 10:01 a.m., approximately two hours before the December 2010 contract's underlying Treasury note ceases to be the on-the-run Treasury note. Upon expiration, the final settlement price of the December 2010 futures will be determined by the yield to maturity on a Treasury note with approximately 1 year 11 months of remaining term to maturity.

Listing Example: February 2011 10-Year OTR Treasury Futures:

The underlying reference Treasury note for the February 2011 10-Year OTR Treasury futures contract is the 10-year Treasury note that is auctioned in November 2010.

The February 2011 futures would begin trading (hypothetically) on 4 Nov. 2010, the business day after announcement of the auction of this Treasury note.

Moreover, the February 2011 futures will be specified to cease trading on the date given by the freshly published Tentative Auction Schedule for the next auction of a new 10-year Treasury note in February 2011. Termination of trading on the last trading day will occur at 10:01 a.m., approximately two hours before the February 2011 contract's underlying Treasury note ceases to be the on-the-run 10-year Treasury note. Upon expiration, the final settlement price of the February 2011 futures will be determined by the yield to maturity on a Treasury note with approximately 9 years 9 months of remaining term to maturity.

Figure 6C:
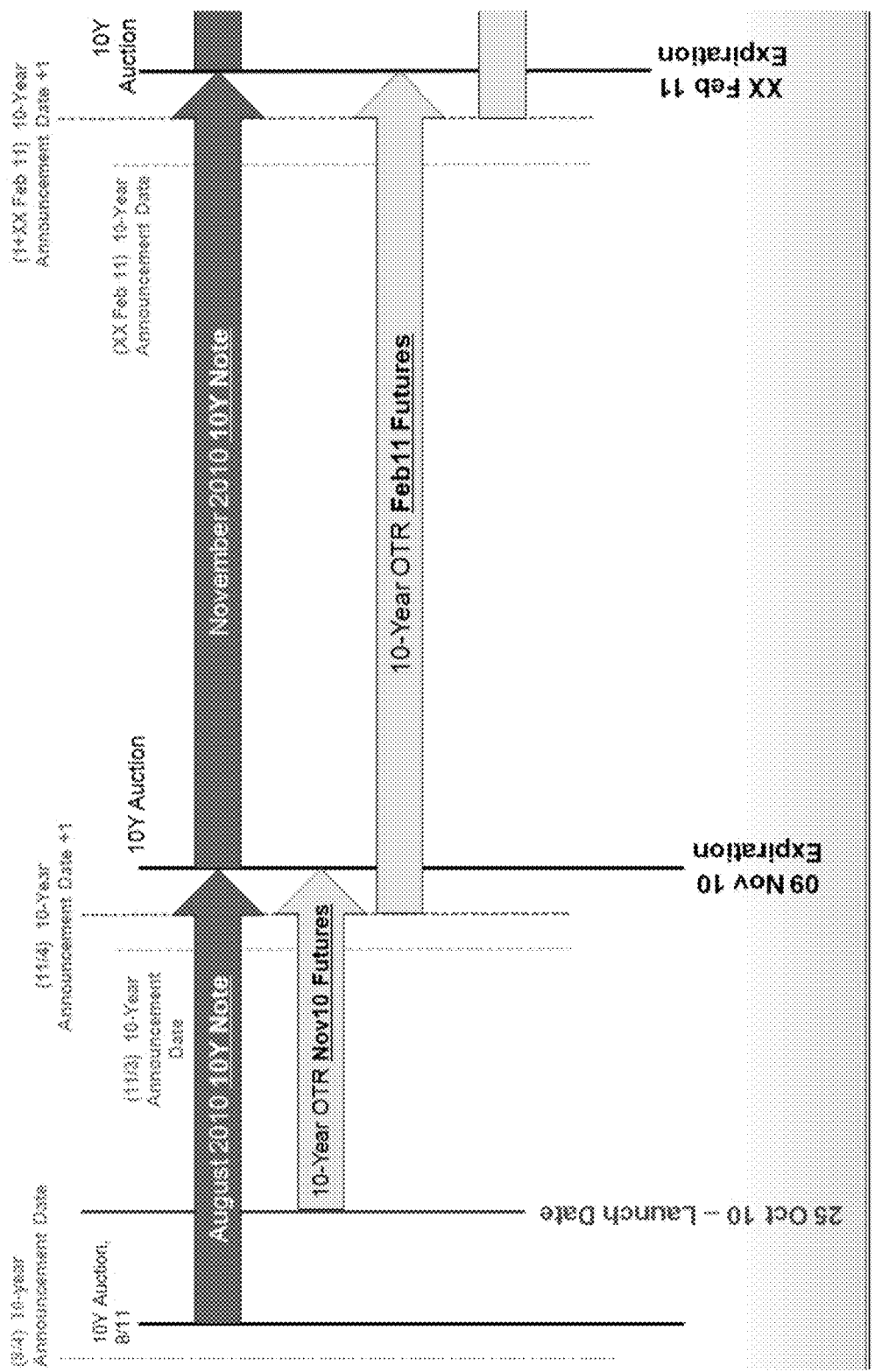

FIGS. 6A-6C show exemplary listing cycles for 2, 5 and 10 year OTR Treasury Futures contracts.

Referring now to FIG. 1, there is shown a block diagram of an exemplary network 100 for trading futures contracts, including in which cash settled OTR Treasury Futures contracts may be implemented, according to the disclosed embodiments. The network 100 couples market participants 104, 106, such as those entities 104 wishing or needing to trade in OTR Treasury Futures contracts, with an exchange 108, such as the CME, also referred to as a central counterparty or intermediary, via a communications network 102, such as the Internet, an intranet or other public or private, secured or unsecured communications network or combinations thereof. The network 100 may also be part of, or alternatively coupled with a larger trading network, allowing market participants 104, 106 to trade other products, such as futures contracts, options contracts, foreign exchange instruments, etc., via the exchange 108.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange 108 implements the functions of matching 110 buy/sell transactions, clearing 112 those transactions, settling 114 those transactions and managing risk 116 among the market participants 104 106 and between the market participants and the exchange 108, as well as OTR Treasury futures scheduling and valuation functionality 122 for administering OTR Treasury futures as will be described. The exchange 108 may include or be coupled with one or more database(s) 120 or other record keeping system which stores data related to open, i.e. un-matched, orders, matched orders which have not yet been delivered, as well as payments made or owing, or combinations thereof.

Typically, the exchange 108 provides a "clearing house" 124 which is a division of the Exchange 108 through which all trades made must be confirmed, matched and settled each day until offset or delivered. The clearing house is an adjunct to the Exchange 108 responsible for settling trading accounts, clearing trades, collecting and maintaining performance bond funds, regulating delivery and reporting trading data. Essentially mitigating credit. Clearing is the procedure through which the Clearing House becomes buyer to each seller of a futures contract, and seller to each buyer, also referred to as a "novation," and assumes responsibility for protecting buyers and sellers from financial loss by assuring performance on each contract. This is effected through the clearing process, whereby transactions are matched. A clearing member is a firm qualified to clear trades through the Clearing House.

As used herein, the term "Exchange" 108 will refer to the centralized clearing and settlement mechanisms, risk management systems, etc., as described below, used for OTR Treasury futures trading, including the described enhancements to facilitate determination of listing date, expiration date and settlement price.

Figure 2:
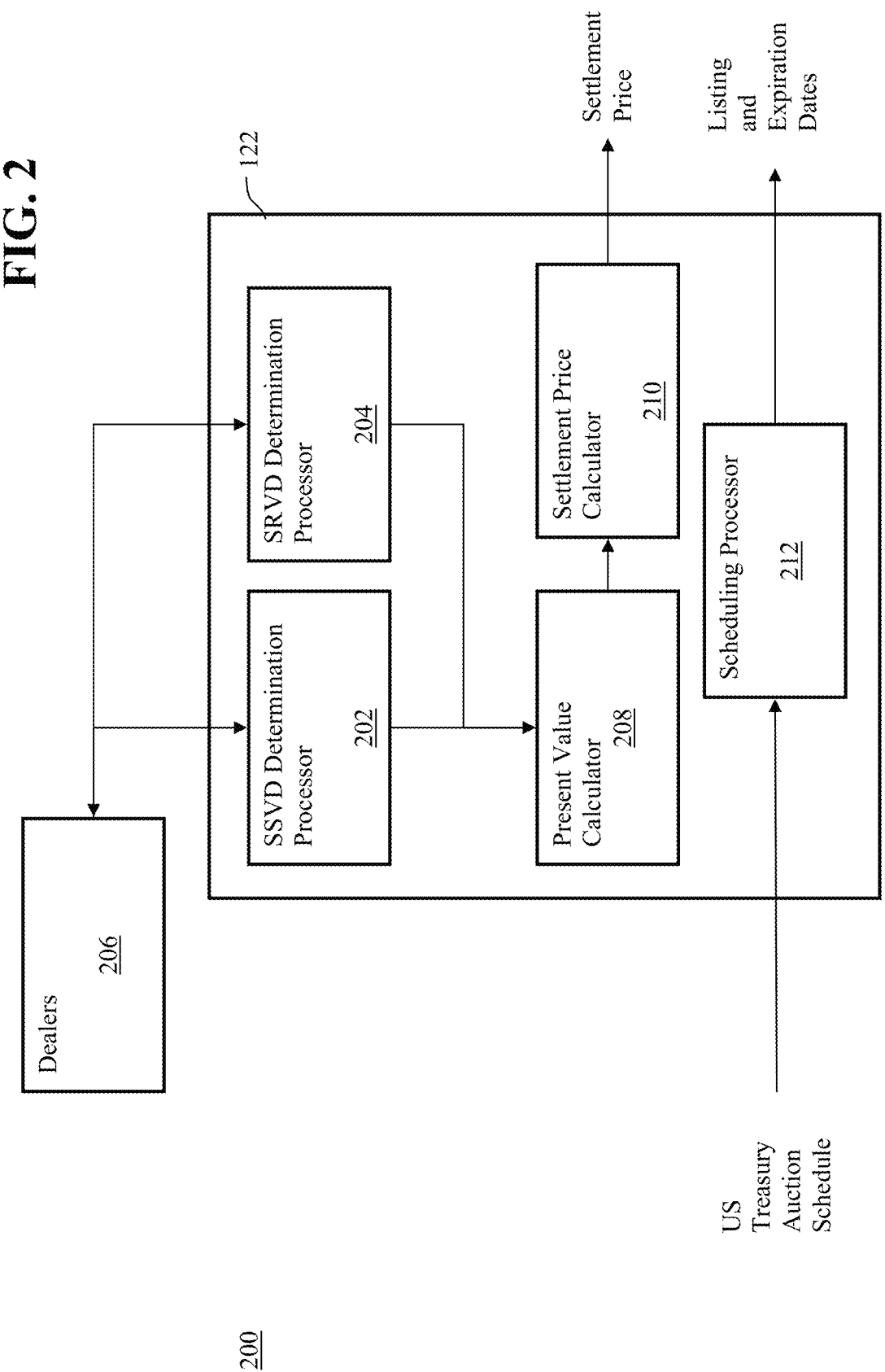
FIG. 2 shows a more detailed block diagram of the OTR Treasury Futures scheduling and valuation according to one embodiment.

Referring to FIG. 2, a more detailed block diagram of the OTR Treasury futures scheduling and valuation functionality 122 is shown which implements a system 200 for computing a settlement price at an expiration date of a cash settled futures contract for the delivery of an underlying most recently issued ("an on-the-run") U.S. Treasury note for a selected tenor of a plurality of tenors, which in one embodiment, may be characterized by a notional face value of $100,000 and the plurality of tenors may comprise 2, 5 and 10 year term to maturity. The system 200 includes: a swap spread value determination ("SSVD") processor 202 operative to determine a swap spread value of the underlying most recently issued U.S. Treasury note for the selected tenor based on a plurality of swap spread quotes of a plurality of contributing dealers 206 thereof; and a swap rate value determination ("SRVD") processor 204 operative to determine a swap rate value of the underlying most recently issued U.S. Treasury note for the selected tenor based on a plurality of swap rate quotes of the plurality of the contributing panel members 206. The system 200 further includes a present value calculator 208 coupled with the swap spread determination processor 202 and the swap rate value determination processor 204 and operative to determine a present value of the underlying most recently issued U.S. Treasury note of the selected tenor based on a calculation of the difference between the swap spread value and the swap spread rate. The system 200 also includes a settlement price calculator 210 coupled with the present value calculator 208 and operative to derive the settlement price based on the determined present value of the most recently issued U.S. Treasury note of the selected tenor.

In one embodiment, the swap spread value determination processor 202 and the swap rate value determination processor 204 are coupled with, such as via the network 102, the International Swaps and Derivatives Association (not shown), such as a database provided thereby, the swap spread value and swap rate value being determined based on a surveyed resulting swap spread and surveyed resulting swap rate for the underlying most recently issued US treasury note of the selected tenor provided thereby.

In one embodiment, the contributing dealers are selected based on one of reputation among dealers, perceived expertise, credit ratings, scale of US dollar swap market activity, or combinations thereof.

In one embodiment, the quote comprises midpoint of the contributing dealer's actual bid/offer spread for a notional amount of $50 million.

In one embodiment, the determination of the surveyed resulting swap spread and surveyed resulting swap rate occurs during a polling interval.

In one embodiment, the determination of swap spread value further comprises determination of a trimmed means of the plurality of swap spread quotes and/or the determination of the swap rate value further comprises determination of a trimmed means of the plurality of swap rate quotes.

In one embodiment, the deriving is not based on a yield to maturity of the underlying most recently issued U.S. Treasury note of the selected tenor.

In one embodiment, the derivation of the settlement price further comprises computation of the final settlement price as: $100*[C/(SY-SP)+(1-C/(SY-SP))*(1+(SY-SP)/200)^{-2*m}]$; where m comprises the selected tenor, C comprises the notional semi-annual coupon rate and (SY-SP) comprises the difference between the determined swap rate value and the determined swap spread value of the underlying most recently issued U.S. Treasury note for the selected tenor.

In one embodiment, the settlement price is rounded to the nearest ¼ of 1⁄32 of one point.

Figure 3:
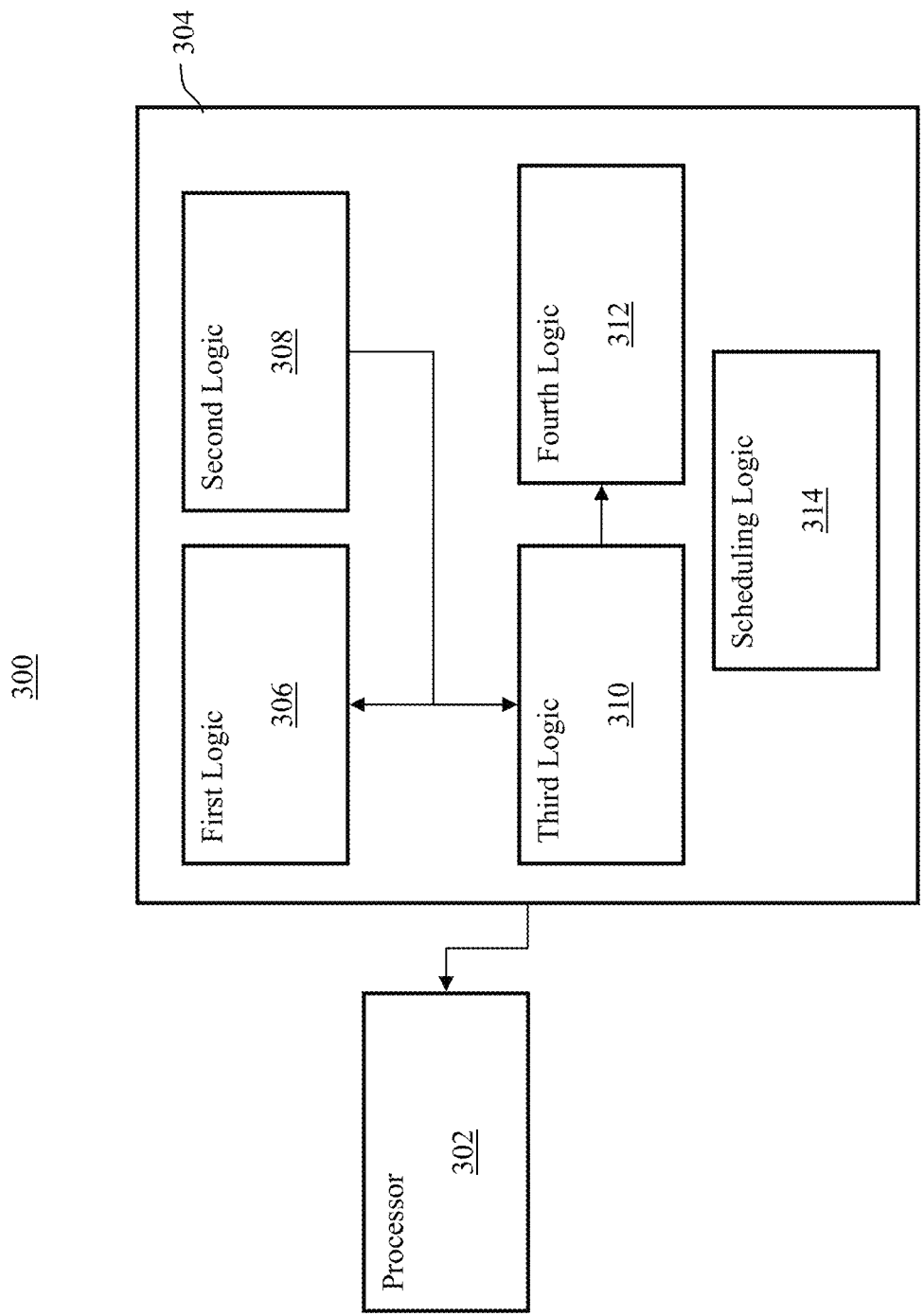
FIG. 3 shows a block diagram of an exemplary implementation of the system of FIGS. 1 and 2 for facilitating scheduling and valuation of OTR Treasury Futures.

As shown in FIG. 3, in one embodiment, a system 300 for computing a settlement price at an expiration date of a cash settled futures contract for the delivery of an underlying most recently issued ("an on-the-run") U.S. Treasury note for a selected tenor of a plurality of tenors, the system comprising a processor 302 and a memory 304 coupled therewith. The system 300 may implement the OTR Treasury futures scheduling and valuation functionality 122 described above. The system 300 further includes first logic 306 stored in the memory 304 and executable by the processor 302 to determine a swap spread value of the underlying most recently issued U.S. Treasury note for the selected tenor based on a plurality of swap spread quotes of a plurality of contributing dealers thereof; second logic 308 stored in the memory 304 and executable by the processor 302 to determine a swap rate value of the underlying most recently issued U.S. Treasury note for the selected tenor based on a plurality of swap rate quotes of the plurality of the contributing dealers; third logic 310 stored in the memory 304 and coupled with the first 306 and second logic 308 and executable by the processor 302 to determine a present value of the underlying most recently issued U.S. Treasury note of the selected tenor based on a calculation of the difference between the swap spread value and the swap spread rate; and fourth logic 312 stored in the memory 304 and coupled with the third logic 310 and executable by the processor 302 to derive the settlement price based on the determined present value of the most recently issued U.S. Treasury note of the selected tenor.

Referring back to FIG. 2, there is further shown a system 200 for further computing a listing date and an expiration date of a cash settled futures contract for the delivery of an underlying most recently issued ("an on-the-run") U.S. Treasury note for a selected tenor of a plurality of tenors. The system 200 further includes a scheduling processor 212 operative to compute the listing date and the expiration date based on a U.S. Treasury note auction cycle for a next to be issued U.S. Treasury note for the selected tenor.

In one embodiment, the listing date, which may comprises a monthly date, is computed as the date which corresponds to the U.S. Treasury's Auction Announcement Date when the selected tenor is one of 2 year or 5 year and/or the listing date, which may comprise a quarterly date, is computed as the date which corresponds to the business day following the U.S. Treasury's Auction Announcement Date when the selected tenor is 10 year. In one embodiment, the expiration date is computed as the date which corresponds to the date of the subsequent U.S. Treasury Auction for the selected tenor. The expiration date and the listing date may be contemporaneously computed.

In one embodiment, the expiration date is computed based on the date of the next new auction listed in the U.S. Treasury's Tentative Auction Schedule on the listing date.

In one embodiment, the listing and expiration dates are computed so as to match the lifecycle of the cash settled futures contract with the life cycle of the most recently issued U.S. Treasury note of the selected tenor.

In one embodiment, the scheduling processor 212 is further coupled with an exchange 108, or a processor thereof, and operative to enable a market participant to trade the cash settled futures contract during the "when issued" period of the underlying most recently issued U.S. Treasury note of the selected tenor.

In one embodiment, the expiration date of the cash settled futures contract for the delivery of the most recently issued U.S. Treasury note for the selected tenor always precedes a listing date of a cash settled futures contract for delivery of a subsequently issued U.S. Treasury note for the selected tenor.

Referring back to FIG. 3, the system 300 is further operative to compute a listing date and an expiration date of a cash settled futures contract for the delivery of an underlying most recently issued ("an on-the-run") U.S. Treasury note for a selected tenor of a plurality of tenors, where the system 300 further includes scheduling logic 314 stored in a memory 304 and executable by the processor 302 to compute the listing date and the expiration date based on a U.S. Treasury note auction cycle for a next to be issued U.S. Treasury note for the selected tenor.

Figure 5:
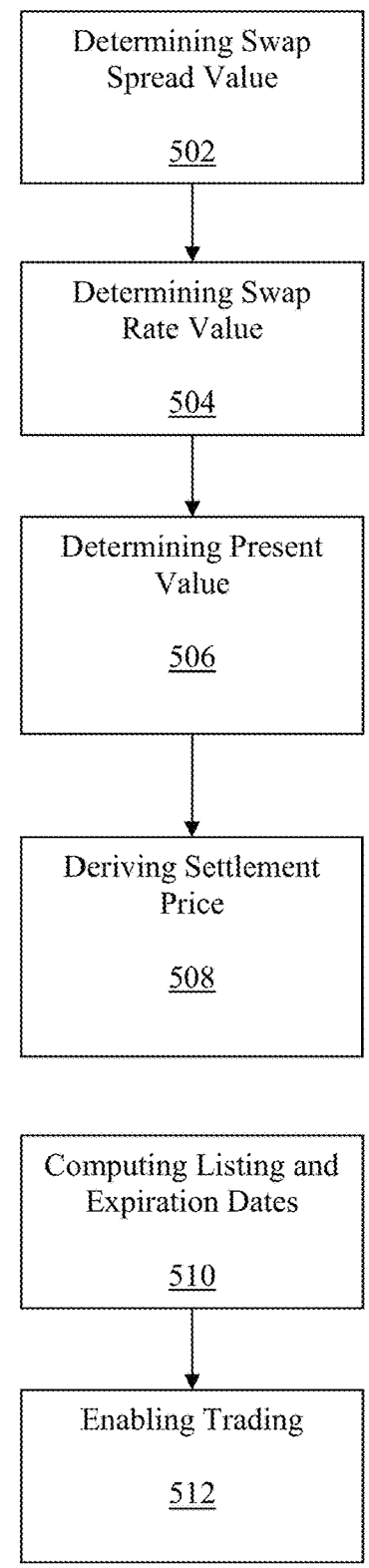
FIG. 5 depicts a flow chart showing operation of the system of FIGS. 1-3.

FIG. 5 depicts a flow chart showing operation of the system of FIGS. 1 and 2. In particular FIG. 5 shows a computer implemented method of computing a settlement price at an expiration date of a cash settled futures contract for the delivery of an underlying most recently issued ("an on-the-run") U.S. Treasury note for a selected tenor of a plurality of tenors. The operation includes: determining, by a processor, a swap spread value of the underlying most recently issued U.S. Treasury note for the selected tenor based on a plurality of swap spread quotes of a plurality of contributing dealers thereof (block 502); determining, by the processor, a swap rate value of the underlying most recently issued U.S. Treasury note for the selected tenor based on a plurality of swap rate quotes of the plurality of the contributing dealers (block 504); determining, by the processor, a present value of the underlying most recently issued U.S. Treasury note of the selected tenor by calculating the difference between the swap spread value and the swap spread rate (block 506); and deriving, by the processor, the settlement price based on the determined present value of the most recently issued U.S. Treasury note of the selected tenor (block 508).

In one embodiment, the underlying most recently issued U.S. Treasury note is characterized by a notional face value of $100,000 and the plurality of tenors comprises 2, 5 and 10 year term to maturity.

In one embodiment, the determining of the swap spread value and swap rate value further comprises obtaining a surveyed resulting swap spread and surveyed resulting swap rate for the underlying most recently issued US treasury note of the selected tenor from the International Swaps and Derivatives Association.

In one embodiment, the contributing dealers are selected based on one of reputation among dealers, perceived expertise, credit ratings, scale of US dollar swap market activity, or combinations thereof.

In one embodiment, the quote comprises midpoint of the contributing dealer's actual bid/offer spread for a notional amount of $50 million.

In one embodiment, the determining occurs during a polling interval.

In one embodiment, the determining further comprises determining the swap spread value as a trimmed means of the plurality of swap spread quotes In one embodiment, determining further comprises determining the swap rate value as a trimmed means of the plurality of swap rate quotes In one embodiment, the deriving is not based on a yield to maturity of the underlying most recently issued U.S. Treasury note of the selected tenor.

In one embodiment, the deriving further comprises computing the final settlement price as: $100*[C/(SY-SP)+(1-C/(SY-SP))*(1+(SY-SP)/200)^{-2*m}]$; where m comprises the selected tenor, C comprises the notional semi-annual coupon rate and (SY-SP) comprises the difference between the determined swap rate value and the determined swap spread value of the underlying most recently issued U.S. Treasury note for the selected tenor. In one embodiment, the settlement price is rounded to the nearest ¼ of 1/32 of one point.

FIG. 5 further shows a computer implemented method of computing a listing date and an expiration date of a cash settled futures contract for the delivery of an underlying most recently issued ("an on-the-run") U.S. Treasury note for a selected tenor of a plurality of tenors. In particular, the operation includes computing, by a processor, the listing date and the expiration date based on a U.S. Treasury note auction cycle for a next to be issued U.S. Treasury note for the selected tenor (block 510) and in turn enabling trading (block 512).

In one embodiment, the listing date is computed as the date which corresponds to the U.S. Treasury's Auction Announcement Date when the selected tenor is one of 2 year or 5 year.

In one embodiment, the listing date is computed as the date which corresponds to the business day following the U.S. Treasury's Auction Announcement Date when the selected tenor is 10 year.

In one embodiment, the expiration date is computed as the date which corresponds to the date of the subsequent U.S. Treasury Auction for the selected tenor.

In one embodiment, the computed expiration date comprises a monthly date when the selected tenor is one of 2 year or 5 year.

In one embodiment, the computed expiration date comprises a quarterly date when the selected tenor is 10 year.

In one embodiment, the expiration date is computed at the same time as the listing date.

In one embodiment, the expiration date is computed based on the date of the next new auction listed in the U.S. Treasury's Tentative Auction Schedule on the listing date.

In one embodiment, the listing and expiration dates are computed so as to match the lifecycle of the cash settled futures contract with the life cycle of the most recently issued U.S. Treasury note of the selected tenor.

In one embodiment, the operation further includes enabling a market participant to trade the cash settled futures contract during the "when issued" period of the underlying most recently issued U.S. Treasury note of the selected tenor.

In one embodiment, the expiration date of the cash settled futures contract for the delivery of the most recently issued U.S. Treasury note for the selected tenor always precedes a listing date of a cash settled futures contract for delivery of a subsequently issued U.S. Treasury note for the selected tenor.

Figure 4:
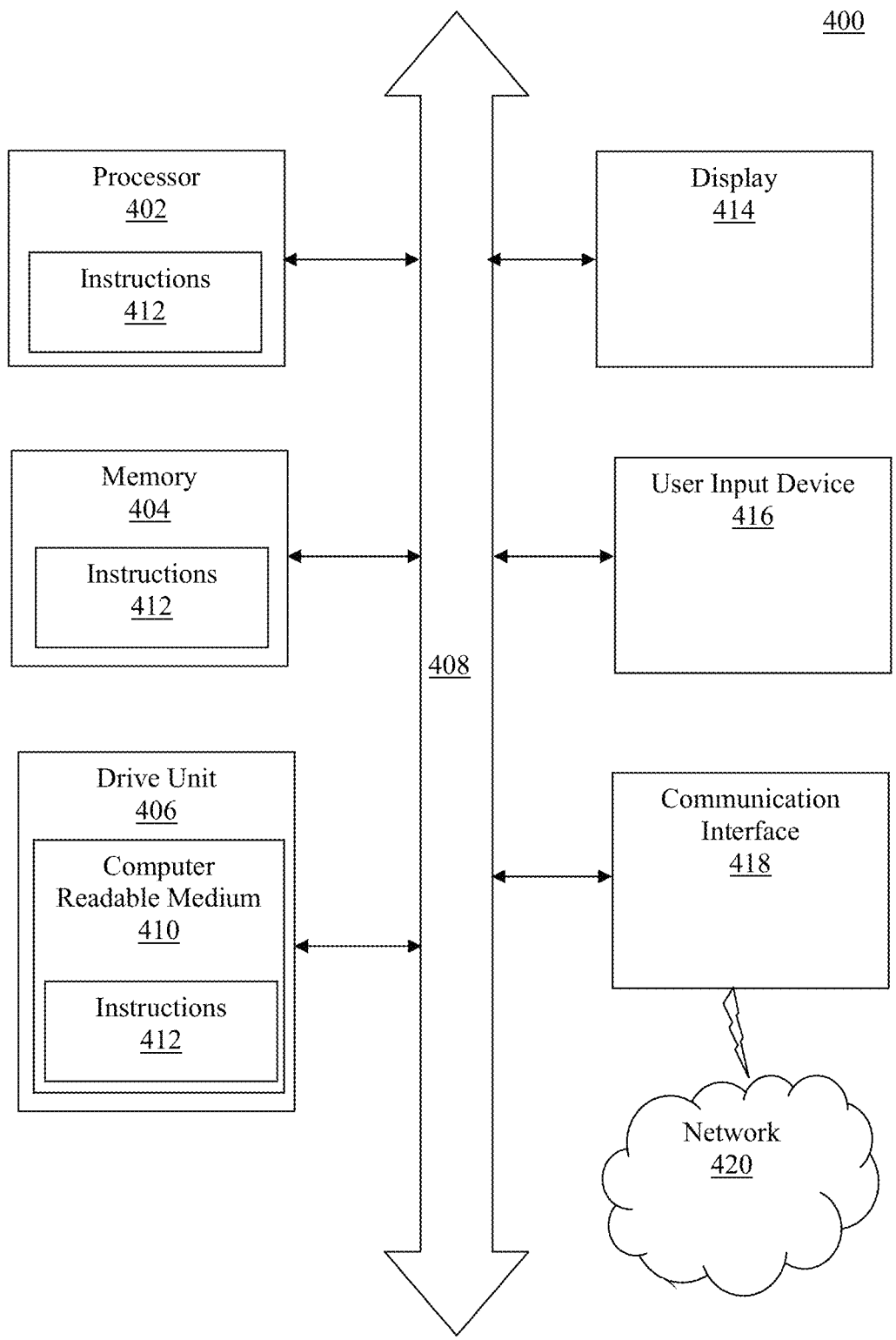
FIG. 4 shows an illustrative embodiment of a general computer system 400 for use with the system of FIG. 1.

Referring to FIG. 4, an illustrative embodiment of a general computer system 400 is shown. The computer system 400 can include a set of instructions that can be executed to cause the computer system 400 to perform any one or more of the methods or computer based functions disclosed herein. The computer system 400 may operate as a standalone device or may be connected, e.g., using a network, to other computer systems or peripheral devices. Any of the components discussed above may be a computer system 400 or a component in the computer system 400. The computer system 400 may implement a match engine, margin processing, OTR Treasury Futures scheduling and/or valuation function on behalf of an exchange, such as the Chicago Mercantile Exchange, of which the disclosed embodiments are a component thereof.

In a networked deployment, the computer system 400 may operate in the capacity of a server or as a client user computer in a client-server user network environment, or as a peer computer system in a peer-to-peer (or distributed) network environment. The computer system 400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single computer system 400 is illustrated, the term "system" shall also be taken to include any collection of systems or sub-systems that individually or jointly execute a set, or multiple sets, of instructions to perform one or more computer functions.

As illustrated in FIG. 4, the computer system 400 may include a processor 402, e.g., a central processing unit (CPU), a graphics processing unit (GPU), or both. The processor 402 may be a component in a variety of systems. For example, the processor 402 may be part of a standard personal computer or a workstation. The processor 402 may be one or more general processors, digital signal processors, application specific integrated circuits, field programmable gate arrays, servers, networks, digital circuits, analog circuits, combinations thereof, or other now known or later developed devices for analyzing and processing data. The processor 402 may implement a software program, such as code generated manually (i.e., programmed).

The computer system 400 may include a memory 404 that can communicate via a bus 408. The memory 404 may be a main memory, a static memory, or a dynamic memory. The memory 404 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 404 includes a cache or random access memory for the processor 402. In alternative embodiments, the memory 404 is separate from the processor 402, such as a cache memory of a processor, the system memory, or other memory. The memory 404 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 404 is operable to store instructions executable by the processor 402. The functions, acts or tasks illustrated in the figures or described herein may be performed by the programmed processor 402 executing the instructions 412 stored in the memory 404. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 400 may further include a display unit 414, such as a liquid crystal display (LCD), an organic light emitting diode (OLED), a flat panel display, a solid state display, a cathode ray tube (CRT), a projector, a printer or other now known or later developed display device for outputting determined information. The display 414 may act as an interface for the user to see the functioning of the processor 402, or specifically as an interface with the software stored in the memory 404 or in the drive unit 406.

Additionally, the computer system 400 may include an input device 416 configured to allow a user to interact with any of the components of system 400. The input device 416 may be a number pad, a keyboard, or a cursor control device, such as a mouse, or a joystick, touch screen display, remote control or any other device operative to interact with the system 400.

In a particular embodiment, as depicted in FIG. 4, the computer system 400 may also include a disk or optical drive unit 406. The disk drive unit 406 may include a computer-readable medium 410 in which one or more sets of instructions 412, e.g. software, can be embedded. Further, the instructions 412 may embody one or more of the methods or logic as described herein. In a particular embodiment, the instructions 412 may reside completely, or at least partially, within the memory 404 and/or within the processor 402 during execution by the computer system 400. The memory 404 and the processor 402 also may include computer-readable media as discussed above.

The present disclosure contemplates a computer-readable medium that includes instructions 412 or receives and executes instructions 412 responsive to a propagated signal, so that a device connected to a network 420 can communicate voice, video, audio, images or any other data over the network 420. Further, the instructions 412 may be transmitted or received over the network 420 via a communication interface 418. The communication interface 418 may be a part of the processor 402 or may be a separate component. The communication interface 418 may be created in software or may be a physical connection in hardware. The communication interface 418 is configured to connect with a network 420, external media, the display 414, or any other components in system 400, or combinations thereof. The connection with the network 420 may be a physical connection, such as a wired Ethernet connection or may be established wirelessly as discussed below. Likewise, the additional connections with other components of the system 400 may be physical connections or may be established wirelessly.

The network 420 may include wired networks, wireless networks, or combinations thereof. The wireless network may be a cellular telephone network, an 802.11, 802.16, 802.20, or WiMax network. Further, the network 420 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

We claim:

1. A computer-implemented method for use with a data transaction processing system which implements an exchange computing system in which data items are transacted by a hardware matching processor that matches electronic data transaction request messages for the same one of the data items based on multiple transaction parameters from different client computers over a data communication network, the method comprising:

receiving, electronically from a database external to the exchange computing system, by a swap rate value determination processor of the exchange computing system, the database coupled therewith via the data communications network, a plurality of swap spread quotes and a plurality of swap rate quotes of a plurality of contributing dealers contributed to the database during a polling interval, the plurality of swap spread quotes and the plurality of swap rate quotes including outlier values as compared to the others of the plurality of swap spread quotes and the plurality of swap rate quotes, and processing the obtained plurality of swap spread quotes and plurality of swap rate quotes to remove the outlier values by using a trimmed means function;

deriving, by a present value calculator and settlement price calculator of the exchange computing system, a settlement price based on a present value of the most recently issued U.S. Treasury note of a selected tenor of a plurality of tenors determined by calculating the difference between a swap spread value and a swap rate value therefore, the swap spread value and the swap rate value having been determined based on the processed plurality of swap spread quotes and plurality of swap rate quotes obtained from the database;

computing, by a scheduling processor of the exchange computing system, a listing date and an expiration date of a cash-settled futures contract for delivery of the underlying most recently issued ("an on-the-run") U.S. Treasury note for the selected tenor based on a U.S. Treasury note auction cycle for a next-to-be-issued U.S. Treasury note for the selected tenor which is announced but not-yet-auctioned ("when issued") having the derived settlement price, wherein the listing date is in a "when issued" period, the multiple transaction parameters based upon which the hardware matching processor matches the electronic data transaction request messages comprising the computed listing date and expiration date;

listing via the data communications network, the cash-settled futures contract by an exchange processor of the exchange computing system coupled with the scheduling processor, to enable a market participant to submit an electronic data transaction request message for a transaction in the cash-settled futures contract to the data transaction processing system;

receiving, by the exchange computing system, the electronic data transaction request message from the market participant and matching, by a matching function, the transaction of the electronic data transaction request message with a previously received transaction counter thereto received from another market participant;

novating, by the exchange computing system, the transaction and the counter transaction so as to bifurcate and transform both from being between the market participant and the other market participant into separate transactions between the exchange computing system and each of the market participant and the other market participant; and executing, by the exchange computing system, at least one of the separate transactions between the exchange computing system and each of the market participant and the other market participant when the other of the separate transactions between the exchange computing system and each of the market participant and the other market participant cannot be completed.

2. The computer-implemented method of claim 1 wherein the listing date is computed as the date which corresponds to the U.S. Treasury's Auction Announcement Date when the selected tenor is one of 2 year or 5 year.

3. The computer-implemented method of claim 1 wherein the listing date is computed as the date which corresponds to the business day following the U.S. Treasury's Auction Announcement Date when the selected tenor is 10 year.

4. The computer-implemented method of claim 1 wherein the expiration date is computed as the date which corresponds to the date of the subsequent U.S. Treasury Auction for the selected tenor.

5. The computer-implemented method of claim 4 wherein the computed expiration date comprises a monthly date when the selected tenor is one of 2 year or 5 year.

6. The computer-implemented method of claim 4 wherein the computed expiration date comprises a quarterly date when the selected tenor is 10 year.

7. The computer-implemented method of claim 1 wherein the expiration date is computed at the same time as the listing date.

8. The computer-implemented method of claim 7 wherein the expiration date is computed based on the date of the next new auction listed in the U.S. Treasury's Tentative Auction Schedule on the listing date.

9. The computer-implemented method of claim 1 wherein the listing and expiration dates are computed so as to match the lifecycle of the cash-settled futures contract with the life cycle of the most recently issued U.S. Treasury note of the selected tenor.

10. The computer-implemented method of claim 1 wherein the expiration date of the cash-settled futures contract for the delivery of the most recently issued U.S. Treasury note for the selected tenor always precedes a listing date of a cash-settled futures contract for delivery of a subsequently issued U.S. Treasury note for the selected tenor.

11. A system for use with a data transaction processing system which implements an exchange computing system in which data items are transacted by a hardware matching processor that matches electronic data transaction request messages for the same one of the data items based on multiple transaction parameters from different client computers over a data communication network, the system comprising:

a swap rate value determination processor operative to receive, electronically from a database external to the exchange computing system, the database coupled therewith via the data communications network, a plurality of swap spread quotes and a plurality of swap rate quotes of a plurality of contributing dealers contributed to the database during a polling interval, the plurality of swap spread quotes and the plurality of swap rate quotes including outlier values as compared to the others of the plurality of swap spread quotes and the plurality of swap rate quotes, and process the obtained plurality of swap spread quotes and plurality of swap rate quotes to remove the outlier values by using a trimmed means function;

a present value and settlement price calculator coupled with the swap rate value determination processor and operative to derive a settlement price based on a present value of the most recently issued U.S. Treasury note of a selected tenor of a plurality of tenors determined by calculation of the difference between a swap spread value and a swap rate value therefore, the swap spread value and the swap rate value having been determined based on the processed plurality of swap spread quotes and plurality of swap rate quotes obtained from the database;

a scheduling processor coupled with the present value and settlement price calculator and operative to compute a listing date and an expiration date of an announced but not-yet-auctioned cash-settled futures contract in a "when issued" period thereof, the cash-settled futures contract being for delivery of the underlying most recently issued ("an on-the-run") U.S. Treasury note for the selected tenor based on a U.S. Treasury note auction cycle for a next-to-be-issued U.S. Treasury note for the selected tenor having the derived settlement price, wherein the listing date is in the "when issued" period, the multiple transaction parameters based upon which the hardware matching processor matches the electronic data transaction request messages comprising the computed listing date and expiration date;

an exchange processor coupled with the scheduling processor and operative to list, via the data communications network, the announced but not-yet-auctioned cash-settled futures contract in the "when issued" period of the underlying most recently issued U.S. Treasury note for the selected tenor to enable a market participant to submit to the data transaction processing system an electronic data transaction request message for a transaction in the announced but not-yet-auctioned cash-settled futures contract in the "when issued" period of the underlying most recently issued U.S. Treasury note for the selected tenor; and wherein the exchange computing system is operative to receive the electronic data transaction request message from the market participant and match, using a matching function, the transaction of the electronic data transaction request message with a previously received transaction counter thereto received from another market participant, novate the transaction and the counter transaction to bifurcate and transform both from being between the market participant and the other market participant into separate transactions between the exchange computing system and each of the market participant and the other market participant, and execute, by the exchange computing system, at least one of the separate transactions between the exchange computing system and each of the market participant and the other market participant when the other of the separate transactions between the exchange computing system and each of the market participant and the other market participant cannot be completed.

12. The system of claim 11 wherein the listing date is computed as the date which corresponds to the U.S. Treasury's Auction Announcement Date when the selected tenor is one of 2 year or 5 year, and wherein the listing date is computed as the date which corresponds to the business day following the U.S. Treasury's Auction Announcement Date when the selected tenor is 10 year.

13. The system of claim 11 wherein the expiration date is computed as the date which corresponds to the date of the subsequent U.S. Treasury Auction for the selected tenor.

14. The system of claim 13 wherein the computed expiration date comprises a monthly date when the selected tenor is one of 2 year or 5 year.

15. The system of claim 13 wherein the computed expiration date comprises a quarterly date when the selected tenor is 10 year.

16. The system of claim 11 wherein the expiration date is computed at the same time as the listing date.

17. The system of claim 16 wherein the expiration date is computed based on the date of the next new auction listed in the U.S. Treasury's Tentative Auction Schedule on the listing date.

18. The system of claim 11 wherein the listing and expiration dates are computed so as to match the lifecycle of the cash-settled futures contract with the life cycle of the most recently issued U.S. Treasury note of the selected tenor.

19. The system of claim 11 wherein the expiration date of the cash-settled futures contract for the delivery of the most recently issued U.S. Treasury note for the selected tenor always precedes a listing date of a cash-settled futures contract for delivery of a subsequently issued U.S. Treasury note for the selected tenor.

20. A system for use with a data transaction processing system which implements an exchange computing system in which data items are transacted by a hardware matching processor that matches electronic data transaction request messages for the same one of the data items based on multiple transaction parameters from different client computers over a data communication network, the system comprising:

means for receiving, electronically from a database external to the exchange computing system, by a swap rate value determination processor of the exchange computing system, the database coupled therewith via the data communications network, a plurality of swap spread quotes and a plurality of swap rate quotes of a plurality of contributing dealers contributed to the database during a polling interval, the plurality of swap spread quotes and the plurality of swap rate quotes including outlier values as compared to the others of the plurality of swap spread quotes and the plurality of swap rate quotes, and processing the obtained plurality of swap spread quotes and plurality of swap rate quotes to remove the outlier values by using a trimmed means function;

means for deriving, by a present value calculator and settlement price calculator of the exchange computing system, a settlement price based on a present value of the most recently issued U.S. Treasury note of a selected tenor of a plurality of tenors determined by calculating the difference between a swap spread value and a swap rate value therefore, the swap spread value and the swap rate value having been determined based on the processed plurality of swap spread quotes and plurality of swap rate quotes obtained from the database;

means for computing, by the exchange computing system, a listing date and an expiration date of a cash-settled futures contract for delivery of the underlying most recently issued ("an on-the-run") U.S. Treasury note for the selected tenor based on a U.S. Treasury note auction cycle for a next to be issued U.S. Treasury note for the selected tenor which is announced but not-yet-auctioned ("when issued") having the derived settlement price, wherein the listing date is in a "when issued" period, the multiple transaction parameters based upon which the hardware matching processor matches the electronic data transaction request messages comprising the computed listing date and expiration date;

means for listing, via the data communications network, the announced but not-yet-auctioned cash-settled futures contract in the "when issued" period of the underlying most recently issued U.S. Treasury note for the selected tenor to enable a market participant to submit to the data transaction processing system an electronic data transaction request message for a transaction in the announced but not-yet-auctioned cash-settled futures contract in the "when issued" period of the underlying most recently issued U.S. Treasury note for the selected tenor;

means for receiving, by the exchange computing system, the electronic data transaction request message from the market participant and matching, by a matching means, the transaction of the electronic data transaction request message with a previously received transaction counter thereto received from another market participant;

means for novating, by the exchange computing system, the transaction and the counter transaction so as to bifurcate and transform both from being between the market participant and the other market participant into separate transactions between the exchange computing system and each of the market participant and the other market participant; and means for executing, by the exchange computing system, at least one of the separate transactions between the exchange computing system and each of the market participant and the other market participant when the other of the separate transactions between the exchange computing system and each of the market participant and the other market participant cannot be completed.

* * * * *